United States Patent [19]
Bantz et al.

[11] Patent Number: 5,257,487
[45] Date of Patent: Nov. 2, 1993

[54] FLOOR BOX FOR IN-FLOOR ACTIVATIONS IN A CONCRETE FLOOR

[75] Inventors: Kermit Bantz; Timothy S. Bowman; Robert Hadfield, all of Parkersburg, W. Va.

[73] Assignee: Butler Manufacturing Company, Kansas City, Mo.

[21] Appl. No.: 907,337

[22] Filed: Jul. 1, 1992

[51] Int. Cl.$^5$ ............................................. H02G 3/08
[52] U.S. Cl. ................... 52/220.1; 52/220.3; 174/48; 174/49; 220/3.6; 220/3.8
[58] Field of Search ................ 52/220.1, 220.3, 220.5; 174/48, 49; 220/3.3, 3.4, 3.5, 3.6, 3.7, 3.8, 532, 533

[56] References Cited

U.S. PATENT DOCUMENTS

| | | | |
|---|---|---|---|
| 3,609,210 | 9/1971 | Guritz | 174/48 |
| 3,701,837 | 10/1972 | Fork | 174/49 |
| 3,724,148 | 4/1973 | Bregenzer | 174/49 |
| 3,769,445 | 10/1973 | Bregenzer | 174/49 |
| 4,057,164 | 11/1977 | Maier | 220/3.6 |
| 4,591,656 | 5/1986 | Mohr | 174/48 |
| 4,728,750 | 3/1988 | Teslovich | 174/48 |
| 4,922,672 | 5/1990 | Bartee et al. | 52/220.1 |

FOREIGN PATENT DOCUMENTS

| | | | |
|---|---|---|---|
| 2220902 | 11/1974 | France | 174/48 |
| 1631763 | 2/1991 | U.S.S.R. | 174/48 |
| 1644277 | 4/1991 | U.S.S.R. | 174/48 |
| 1505500 | 3/1978 | United Kingdom | 174/48 |

*Primary Examiner*—Carl D. Friedman
*Assistant Examiner*—Wynn E. Wood
*Attorney, Agent, or Firm*—McAndrews, Held & Malloy, Ltd.

[57] ABSTRACT

This patent discloses a floor box for a service distribution system in a concrete floor slab. The floor box has a bottom, end walls, and side walls that define an interior of the box and a frame support that is positioned within the box and engages end walls and side walls to maintain the end walls and side walls in close conformance at their junction. The frame support also supports an activation frame of an activation kit positioned within an upper opening of the floor box. The floor box is less expensive to manufacture than floor boxes that are manufactured to maintain structural integrity independent of a surrounding concrete floor slab.

4 Claims, 3 Drawing Sheets

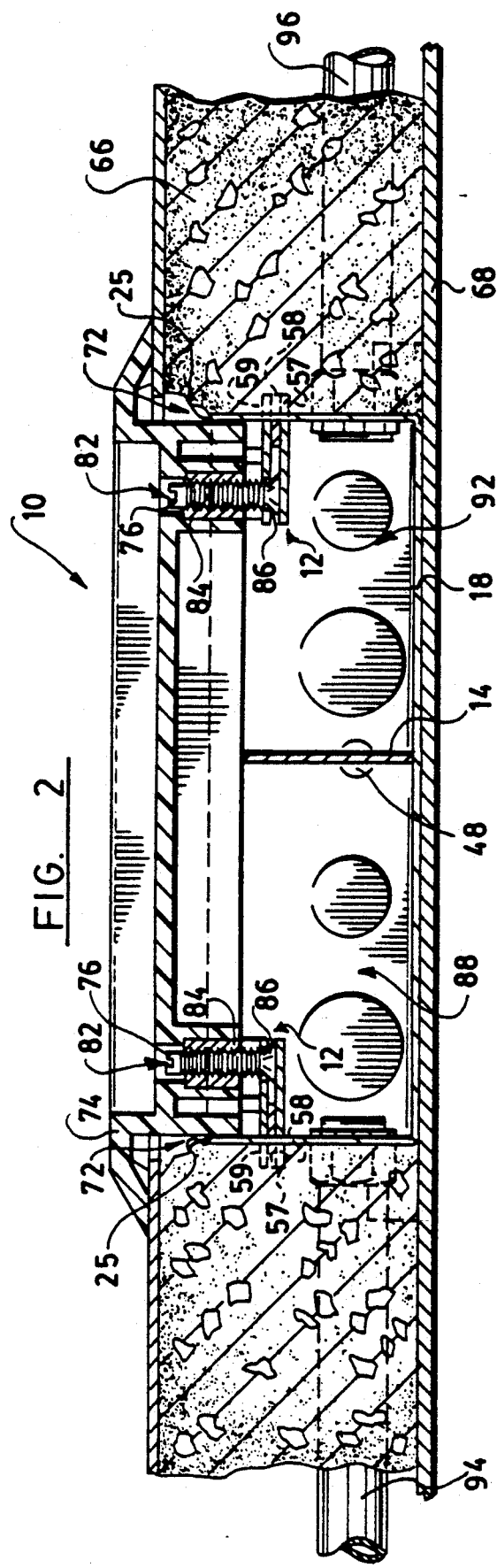

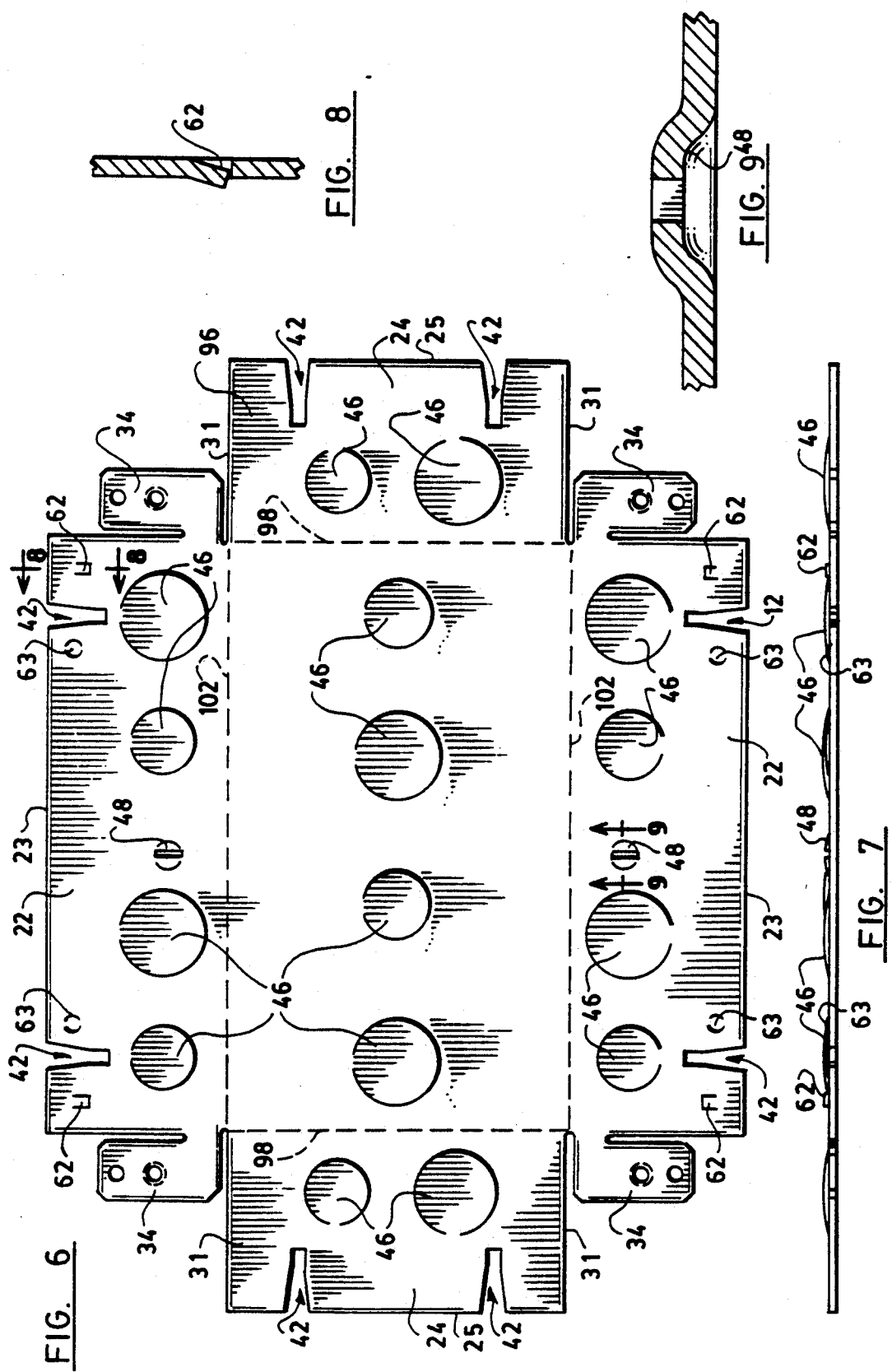

FLOOR BOX FOR IN-FLOOR ACTIVATIONS IN A CONCRETE FLOOR

BACKGROUND OF THE INVENTION

The present invention relates to floor boxes for in-floor distribution systems in a concrete floor, and more particularly, to a floor box that is connected to and part of a service distribution system in a concrete floor slab and in which an in-floor activation kit may be installed to provide access to services from above the floor.

In-floor service distribution systems for concrete slab floors are assembled on a deck sheet or floor form and cast into the floor slab. The service distribution system must be concrete tight to prevent partial or complete filling of parts of the system by concrete seeping into the distribution system before setting of the slab. Thereafter the surrounding concrete supports and reinforces the distribution system.

Floor boxes for in-floor activations are positioned in a concrete floor slab closely below the upper floor surface and are constructed to accept an activation kit. Activation kits conventionally have a frame that is secured to the floor box in a manner that allows adjustment of the frame in a direction generally perpendicular to the floor surface. That adjustment allows the frame to be positioned flush with the floor surface. Concrete floor slabs may be of various depths or thicknesses and floor boxes of various depths are desirable to provide capacity to accept more or larger service conductors or components.

In-floor floor boxes for activation kits are typically constructed to be conventionally connected to conduit and are adapted to accept activation kits. Such floor boxes are typically constructed like electrical boxes used for conventional electrical distribution systems that may be secured to walls or joists and that provide support for the distribution system. Joints of conventional electrical boxes, such as at junctions of adjacent walls, are connected by conventional means such as by welding, deforming overlapping sections of the walls, or by fasteners such as rivets or screws. This conventional construction provides strength that is not required for a floor box that is embedded in a concrete slab. A floor box for an in-floor distribution system must be strong enough to maintain connection to conduit and prevent concrete from seeping into the floor box during pouring and setting of the concrete floor slab. After the concrete has set, the floor box must only support the activation kit.

Accordingly, a need exists for a floor box for in-floor service distribution systems that maintains connection to the in-floor distribution system and remains concrete tight during pouring and setting of the concrete floor slab, that supports an activation kit after the concrete floor slab has set, and that is less expensive to manufacture than prior floor boxes. In addition, the need exists for a floor box for an in-floor service distribution system that cooperates with concrete surrounding the floor box to provide support for an activation kit.

SUMMARY OF THE INVENTION

The inventors recognized that because service distribution systems in a concrete floor must maintain structural integrity only until the concrete sets, that a floor box may meet these requirements without meeting the structural requirements of conventional floor boxes. As a consequence, a floor box may be constructed to meet the requirements for use in an in-floor electrical distribution system that is less expensive to manufacture than conventional floor boxes.

This invention overcomes the disadvantages of prior floor boxes for in-floor distribution systems for concrete floors. A floor box is provided that has a bottom with end walls and side walls extending from the bottom to form a continuous side boundary defining an upper opening opposite the bottom. The bottom and side walls define an interior that is sized to accept an in-floor activation kit. Each end wall is defined by an upper edge, side edges, and bottom boundary at which the end wall meets the bottom. Each side wall is defined by an upper edge and a bottom boundary at which the side wall meets the bottom. The side walls extend adjacent to side edges of the opposed end walls. The side walls are formed to substantially conform to the side edges of an the side walls providing a concrete tight junction. The upper edges of the side walls and end walls define a continuous upper edge of the side boundary defining the upper opening of the box. An activation frame support engages adjacent side and end walls near their junction. The frame support includes a base extending into the interior of the floor box and a retainer closely spaced from the base between the base and the upper opening. The frame support extends through the adjacent side and end walls to engage concrete adjacent to the floor box and to restrain the adjacent side and end walls from movement away from each other maintaining the side edge in close conformance with the side wall.

The frame support may include a spacer between the base and retainer to closely space the retainer from the base. The retainer may define a slot allowing a threaded section of an activation kit frame adjustment screw to extend through the slot toward the upper opening and a head of the adjustment screw to be captured between the base and the retainer adjacent to the slot. A box cap that closely conforms to the upper opening is positioned in the floor box supported by the frame support to close the upper opening of the floor box preventing concrete from entering the floor box before the concrete floor slab sets.

Accordingly, it is an object of the present invention to provide a floor box for use with an in-floor service distribution system that is concrete tight and is less expensive to manufacture than conventional floor boxes.

Another object of the present invention is to provide a floor box for use with an in-floor service distribution system that includes a frame support that will accept an in-floor activation kit and restrains adjacent side and end walls of the floor box from movement away from each other.

Yet another object of the present invention is to provide a floor box for an in-floor distribution system that does not require that side and end walls be joined to each other by conventional fastening methods.

A further object of the present invention is to provide a floor box for an in-floor distribution system having a support for a conventional in-floor activation kit that restrains side walls of the floor box in concrete tight conformance with each other.

Yet a further object of the present invention is to provide a floor box for an in-floor distribution system that can be formed from a blank formed by a single punch operation.

A still further object of the present invention is to provide a floor box that may be easily manufactured to be of various desired depths to provide capacity allowed by different thickness floor slabs.

These and other objects and advantages of the present invention, as well as details of the preferred embodiment thereof, will be more fully understood from the following description and the drawings.

BRIEF DESCRIPTION OF THE DRAWINGS

FIG. 2 is a cross section view of the floor box of FIG. 1 cast into a floor slab, connected to two in-floor distribution systems, and supporting a frame of an in-floor activation kit.

FIG. 3 is a top view of a base plate for a frame support according to the present invention.

FIG. 4 is a top view of a spacer plate for a frame support according to the present invention.

FIG. 5 is a top view of a retainer plate for a frame support according to the present invention.

FIG. 6 is a top view of a blank from which the floor box of FIG. 1 is formed by a single punch operation.

FIG. 7 is a side view of the blank of FIG. 6.

FIG. 8 is a cross section view of the section 8—8 of FIG. 7.

FIG. 9 is a cross section view of the section 9—9 of FIG. 7.

Figure 1:
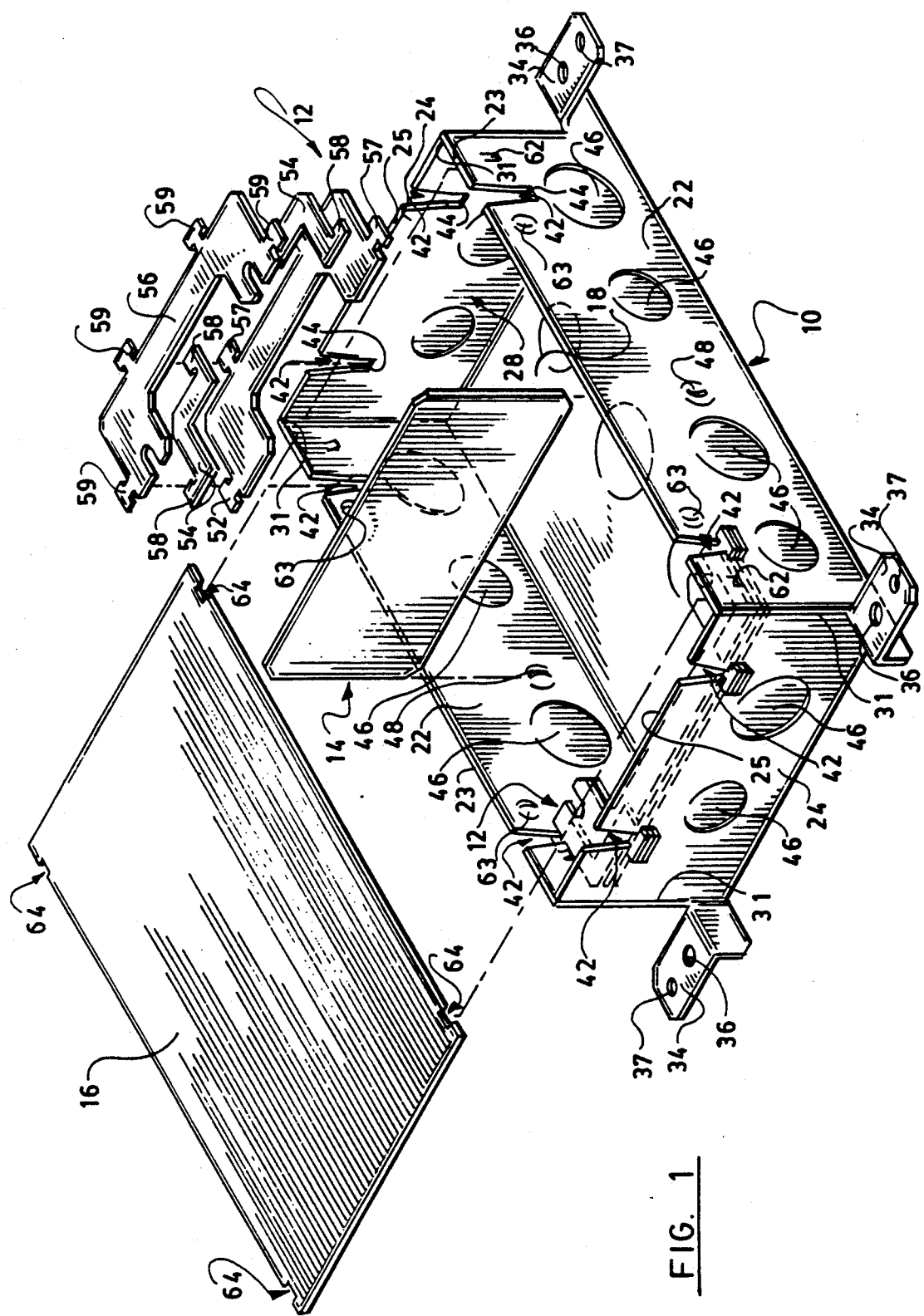
FIG. 1 is a perspective partially exploded view of a floor box for an in-floor distribution system according to the present invention.

In the following detailed description, spatially orienting terms are used such as "left," "right," "upward," "downward," and the like. It is to be understood that these terms are used for convenience of description of the preferred embodiments by reference to the drawing; unless so specified, these terms do not necessarily describe the absolute location in space, such as left, right, upward, downward, etc., that any part must assume.

DESCRIPTION OF THE PREFERRED EMBODIMENT

FIG. 1 shows a floor box 10 according to the present invention including activation frame support 12, partition 14, and box cap 16. The floor box 10 has a bottom 18 from which two side walls 22 extend generally perpendicularly to an upper edge 23. Two end walls 24 extend generally perpendicularly from bottom 18 to an upper edge 25. The end walls 24 extend between the side walls 22. The side walls 22 and end walls 24 form a continuous side boundary of the floor box 10 extending from the bottom 18 to an upper opening 28 bounded by the upper edges 23 and 25.

The end walls 24 are bounded by side edges 3 extending from the bottom 18 to the upper edge 25. The side edges 31 are generally perpendicular to the bottom 18. The side walls 22 are flat and positioned against the side edges 31 of opposed end walls 24 forming a concrete tight junction at the edges 31.

The side walls 22 extend between the end walls 24 and include two support tabs 34, each extending generally parallel to the bottom 18 from a section of the side wall 22 extending outwardly from an end wall 24. Each support tab 34 includes a threaded height adjustment hole 36 and an unthreaded hole 37. The function of these holes is described below.

Each side wall 22 and end wall 24 includes two frame support slots 42 extending toward the bottom 18 from the upper edge 23 and 25 respectively, to a frame support surface 44. The side walls 22 and end walls 24 each have two frame support slots 42, are located near the junction of a side wall 22 with an adjacent side edge 31. The side walls 22 and end walls 24 each include conventional conduit knockouts 46 for connection to conduit. The side walls 22 each include support on indent 48 having a slot oriented generally perpendicular to the bottom 18 and sized to accept the partition 14. The frame support 12 include a base plate 52, a spacer plate 54, and a retainer plate 56. The base plate 52 includes retaining tabs 57 sized to extend through the frame support slot 42. The base plate 52 is positioned within the floor box 10 along an end wall 24 with a support tabs 57 extending through each support slot 42 in the end wall 24 and through the support slots 42 in the side walls 22 near the end wall 24 adjacent to the base plate 52. The support tabs 57 rest against the frame support surfaces 44. The spacer plates 54 include two support tabs 58, also sized to extend into the support slots 42. Two spacer plates 54 are supported by a base plate 52, one adjacent to each side wall 22. One support tab 58 extends through the frame support slot 42 in the adjacent side wall 22 and one tab 58 through the frame support slot 42 in the end wall 24 nearest the side wall 22. The retainer plate 56 includes support tabs 59 also sized to extend through the support slots 42. The retainer plate 56 overlies the base plate 52 and is supported by two spacer plates 54. The retainer plate 56 includes support tabs 59 sized and positioned to extend into the support slots 42 in the end wall 24 and the support slots 42 in the side walls 22 adjacent to the end wall 24.

The side walls 22 include two frame support tangs 62 extending toward the interior floor box 10 from a location between a frame support slot 42 adjacent to an end wall side edge 31 and the side edge 31, at a location between the upper edge 23 and the frame support surface 44. The frame support tang 62 may be resiliently displaced outwardly to allow the components of the frame support 12 to be positioned in the frame support slots 42 when inserted into the slots 42 from the upper opening of the floor box 10. The frame support tang 62 is positioned to allow the frame support 12, including the base plate 52, spacer plate 54, and retainer plate 56 to be positioned within the frame support slots 42 and between the frame support tang 62 and the frame support surface 44. The frame support surface 44 and frame support tang 62 thereby cooperate to capture the frame support 12 therebetween.

The box cap 16 is sized to be positioned within the upper opening 28 and be supported by the frame support 12. The boundary of the box cap 16 includes tang notches 64 sized and positioned to allow the box cap 16 to be supported by the frame support 12 without engaging the frame support tangs 62. Each side wall 22 includes two cover retaining dimples 63 deformed toward the interior of floor box 10 and located adjacent to between floor support slots 42, one dimple 63 generally adjacent one support slot 42, and the other dimple 63 adjacent to the other slot 42. The dimples 63 are located a distance from the upper edge 23 to secure the cover 16 between the dimples 63 and the floor supports 12. The cover 16 is positioned on the floor supports 12 by forcing the cover 16 toward the floor supports 12 resiliently deforming the dimples 63 outwardly allowing the cover to contact the floor supports 12 and securing the cover against the floor supports 12.

FIG. 2 shows the floor box 10 of FIG. 1 cast into a concrete floor slab 66. The floor box 10 is supported by the bottom 18 of the floor box 10 resting directly on the floor form 68. Alternatively, adjusting screws (not shown) may engage the support tabs 34 at the threaded height adjustment holes 36 and position the floor box 10 a distance above a floor form such as 68. Further, a floor box may also be secured to a floor form after positioning by height adjustment screws, by securing the box 10 to the floor form by driving nails through the unthreaded holes 37 of the floor support tab 10 and into a wooden floor form 68, or, passing wires or screws through the unthreaded holes 37 and holes in the floor form 68 to secure the box 10 to the floor form 68.

FIG. 2 shows an opening 72 in the concrete slab 66 above the floor box 10. The floor box 10 is cast into the floor slab 66 with a layer of concrete overlying the cover 16 and floor box 10. To install an activation kit in the floor box 10, the opening 72 is made by chipping concrete lying above upper edges 23 and 25 of the floor box 10 and removing the concrete overlying the box cap 16.

As shown by FIG. 2, an activation frame 74 of an activation kit is positioned within the opening 28 in the floor box 10 and is secured to the floor box 10 by adjusting screws 76 that engage the activation frame 74 and the frame support 12. The activation frame 74 includes holes 82, each having a threaded insert 84 that are positioned above the frame support 12. Each height adjusting screw 76 engages a threaded insert 84 and includes a slot at the upper end of the height adjusting screw which may be engaged by a screw driver (not shown) to rotate the height adjusting screw 76 and thereby positioning the activation frame 74 with respect to the frame support 12. The height adjusting screws 76 each have a head 86 of greater diameter than the threaded section of the height adjusting screw 76 that is opposite the height adjusting screw slot. The head 86 of the height adjusting screw 76 is sized to have a thickness less than that of the spacers 54 so that the head 86 may be inserted between the base plate 52 and the retainer plate 56 of the frame support 12.

The floor box 10 may be separated into service sections 88 and 92, by the partition 14. The service sections 88 and 92 are bounded by an end wall 24, bottom 18, side walls 22 and the partition 14. Conduits 94 and 96 connected opposed end walls 24, provide services that are separated in the service sections 88 and 92 respectively. An activation kit adapted to be secured to the activation frame 74 and extend to the partition 14 maintains separation of those services to connectors (not shown) secured to the activation frame 74. Conductors (not shown) from conduit 94 or 96 may be routed through the activation frame 74 to locations above the floor slab 66.

The base support tabs 57, spacer support tabs 58 and retainer plate support tabs 59 extend outwardly from the side walls 22 and end walls 24 as shown by FIG. 2, and engage the concrete floor slab 66 surrounding the floor box 10. As illustrated by FIGS. 3, 4, and 5, the support tabs 57, 58, and 59 include a narrow section sized to be positioned within a frame support slot 42 and a wider portion at the outer extent of the support tab sized to overlie a section of the floor box adjacent to a frame support slot. When support tabs 57, 58, and 59 engage the side walls 22 and end walls 24, they act to support the side walls 22 against the side edges 31 of the end walls 24.

As best shown by FIG. 1, the spacer 54 overlies the outermost section of a baseplate 52 at an intersection of a side wall 22 and an end wall 24. As shown by FIG. 5, the retainer plate 56 includes adjusting screw slots 94. Screw slots 94 are sized to allow the threaded section of the height adjusting screw 76 to extend through the slot and to overlie the head 86 of the height adjusting screw 76, as best shown by FIG. 2. The height adjusting screw 76 may be positioned within the adjusting screw slots 94 from within the floor box 10 after the box cap 16 is removed. The activation frame 74 may then be positioned so that the holes 82 overlie the height adjusting screw 76 and the height adjusting screw 76 may be advanced into the threaded insert 84 by a screwdriver extending through the inserts 84 from above the activation frame. An activation kit (not shown) including connectors or other conventional activation hardware may be secured to the activation frame 74 in a conventional manner.

FIG. 6 illustrates a blank 96 from which the floor box 10 is formed. The end walls 24 are bent to be generally perpendicular to the bottom 18 by bending the blank 96 along a bend line 98 connecting the innermost extent of side edges 31 from an upper edge 25. The side walls 22 are bent to be generally perpendicular to the bottom 18 along a bend line 102 defined by the innermost extent of opposed side edges 31 of opposed end walls 24. The support tabs 34 are bent outwardly from the side walls 22 to be generally parallel to the bottom 18. The depth of the floor box 10 formed from the blank 96 is the distance from bend lines 102 and 98 to upper edges 23 and 25, respectively. The depth of the floor box 10 may be increased by increasing that dimension and requires no other modification of the blank 96 or the method of forming the floor box 10 from the blank 96.

As illustrated by FIG. 7, the conduit knockouts 46, the frame support tangs 62, cover retaining dimples 63, and the slotted partition support indents 48 are all formed by displacement toward one side of the blank. The blank for the floor box 10 is formed by a single punch press operation that shears the boundary of the blank 96 and deforms the conduit knockouts 46, slotted partition support indents 48, and frame support tangs 62.

FIG. 8 illustrates the section 8—8 of FIG. 7 showing the cross section of the frame support tang 62. FIG. 9 shows the section 9—9 of FIG. 6 which illustrates the cross section of the slotted partition support indent 48.

As will be apparent to those of skill in the art, modification and variations of the present invention are possible in light of the above teachings. Thus, it will be understood that, within the scope of the appended claims, the invention may be practiced other than as described above.

We claim:

1. An improved floor box assembly adapted to be mounted in a concrete floor slab at the lower end of a floor opening that is formed in the concrete floor so as to generally have the cross-sectional shape and size and a vertical length that extends from an upper surface of the concrete floor slab to an upper opening of the floor box assembly, the floor box having an upper edge defining the upper opening and further adapted to accept electrical power, data and communication connectors and allow connection to distribution systems that are in the concrete floor, the improved floor box assembly comprising:

a floor box including a bottom, and side walls and end walls that extend vertically upwardly from the bottom and have upper ends that define an upper opening in the floor box which communicates with the lower end of the floor opening, the bottom and the end and side walls defining an interior space within the floor box and with at least one of the walls adapted to be connected to a distribution system and at least one wall having a support slot extending from the upper edge toward the bottom to a frame support surface;

a frame support positioned within the floor box adjacent to the support slot and having a support tab extending through the support slot resting against the support surface and overlying a section of the wall adjacent to the slot; and a cover having a size and shape such that the access opening cover is adapted to fit within the upper opening and overlie the frame support;

whereby the cover prevents concrete from filling the floor box before the concrete slab has set and may be removed providing access to the interior of the floor box after concrete overlying the floor box is removed to form the floor opening, and, the frame support engages the surrounding concrete at the support tab.

2. An improved floor box assembly according to claim 1 wherein the one wall having a support slot is a first side wall and the support slot is positioned near a junction of the first side wall with a first end wall, the first end wall including a support slot near the junction of the first end wall with the first side wall and extending from the upper edge of the first end wall to a support surface that is spaced from the bottom a distance equal to the distance from the bottom to the support surface of the support slot in the side wall and the frame support has a second support tab that extends through the support slot in the first end wall, rests against the support surface cf the support slot in the first end wall, and overlies a surface of the first end wall opposite the interior of the floor box adjacent to the slot in the first end wall whereby the frame support engages the first side wall and the first end wall near the junction of the first side wall and the first end wall and supports the first side wall and the first end wall in conformance at their junction.

3. The improved floor box assembly according claim 2 wherein the first end wall has a second support slot extending from the upper edge of the first end wall to a second end wall support surface a distance from the bottom that is equal to the distance from the support surface of the support slot to the bottom and the second end wall support slot is positioned near a junction of the first end wall and a second side wall and a second side wall has a support slot extending from its upper edge toward the bottom to a support surface separated from the bottom by the distance from the bottom to the support surface of the second support slot of the first end wall and the frame support further includes support tabs positioned and sized to extend through the second support slot of the first end wall and the support slot of the second side wall, to rest against the support surfaces of the second support slot of the first end wall and the support surface of the second side wall and to overlie a section of the end wall adjacent to the second support slot and a section of the second side wall adjacent to the support slot of the second side wall whereby the support tabs of the floor support maintain the first end wall and the first side wall and the second side wall in conformance.

4. The improved floor box assembly of claim 3 wherein the floor support includes a base plate being generally planar and sized to conform to interior surfaces of the first side wall, first end wall, and second side wall and has tabs that extend outwardly from edges of the frame support conforming to the first and second side walls and first end wall of the floor box and sized to extend through the support slots and overlie the surfaces of the walls opposite the interior of the floor box adjacent to the support slots, a spacer plate adapted to conform to a section of the first side wall and first end wall adjacent to the junction of the first side wall and first end wall and extend from the junction of the first side wall and the first end wall to the support slot of the first side wall and the support slot of the first end wall and having support tabs sized and positioned to extend through the support slot of the first side wall and the support slot of the first end wall and overlie a section of the surface of the first side wall and the first end wall opposite the interior of the floor box adjacent to the support slots, a second spacer plate adapted to conform to the first end wall and the second side wall adjacent to the junction of the first end wall and the second side wall and having support tabs sized and positioned to extend through the second support slot of the first end wall and the support slot of the second side wall and to overlie a section of the walls opposite the interior of the floor box adjacent to the second support slot of the first end wall and the support slot of the second side wall, and a retainer plate sized to overlie the base plate and having support tabs sized and positioned to overlie the support tabs of the retainer plate and having adjusting screw slots in the retainer plate overlying a section of the base plate that is separated from the spacer plate and the floor box assembly further comprises an adjusting screw having a generally cylindrical threaded section and a head at a first end of the threaded section of larger diameter than the threaded section and thickness less than the spacer plate and the diameter of the threaded section is less than a dimension of the adjusting screw slots whereby the adjusting screw may be retained by the frame support by positioning the head of the adjusting screw between the base plate and the retainer plate and allowing the threaded section to extend through the adjusting screw slot in the retainer plate in a direction toward the upper opening of the floor box.

* * * * *